(12) United States Patent
Neiger et al.

(10) Patent No.: US 8,910,158 B2
(45) Date of Patent: Dec. 9, 2014

(54) VIRTUALIZING INTERRUPT PRIORITY AND DELIVERY

(75) Inventors: Gilbert Neiger, Portland, OR (US);
Rajesh M. Sankaran, Portland, OR (US); Gideon Gerzon, Ziehron Ya'akov (IL); Richard A. Uhlig, Hillsboro, OR (US); Sergiu D. Ghetie, Hillsboro, OR (US); Michael Neve de Mevergnies, Beaverton, OR (US); Adil Karrar, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 13/325,714

(22) Filed: Dec. 14, 2011

(65) Prior Publication Data

US 2013/0159579 A1    Jun. 20, 2013

(51) Int. Cl.
*G06F 9/455* (2006.01)

(52) U.S. Cl.
USPC .............................................................. 718/1

(58) Field of Classification Search
CPC ............................... G06F 9/4812; G06F 13/24
See application file for complete search history.

(56) References Cited

U.S. PATENT DOCUMENTS

| 2007/0157197 A1* | 7/2007 | Neiger et al. ...................... 718/1 |
| 2008/0216175 A1 | 9/2008 | Pike |
| 2009/0083829 A1 | 3/2009 | Peterson |
| 2009/0300250 A1* | 12/2009 | Weissman ..................... 710/260 |
| 2009/0328035 A1* | 12/2009 | Ganguly ........................... 718/1 |
| 2010/0138208 A1 | 6/2010 | Hattori et al. |
| 2010/0223611 A1* | 9/2010 | Mahalingam et al. ............ 718/1 |
| 2011/0197003 A1* | 8/2011 | Serebrin et al. ............... 710/267 |
| 2011/0307641 A1* | 12/2011 | Ganguly ....................... 710/262 |

FOREIGN PATENT DOCUMENTS

| EP | 2363805 A1 | 9/2011 |
| WO | 2013/090202 A1 | 6/2013 |

OTHER PUBLICATIONS

International Search Report and Written opinion received for PCT Patent Application PCT/US2012/068798, mailed on Mar. 28, 2013, 9 pages.
International Preliminary Report on Patentability received for PCT Patent Application No. PCT/US2012/068798, mailed on Jun. 26, 2014, 6 pages.

* cited by examiner

*Primary Examiner* — Meng An
*Assistant Examiner* — James J Lee
(74) *Attorney, Agent, or Firm* — Thomas R. Lane (57) ABSTRACT

Embodiments of processors, methods, and systems for virtualizing interrupt prioritization and delivery are disclosed. In one embodiment, a processor includes instruction hardware and execution hardware. The instruction hardware is to receive a plurality of instructions, including a first instruction to transfer the processor from a root mode to a non-root mode for executing guest software in a virtual machine, wherein the processor is to return to the root mode upon the detection of any of a plurality of virtual machine exit events. The execution hardware is to execute the first instruction, execution of the first instruction to include determining a first virtual processor-priority value and storing the first virtual processor-priority value in a virtual copy of a processor-priority field, where the virtual copy of the processor-priority field is a virtual resource corresponding to a physical resource associated with an interrupt controller.

13 Claims, 9 Drawing Sheets

FIGURE 9
METHOD 900

VIRTUALIZING INTERRUPT PRIORITY AND DELIVERY

BACKGROUND

1. Field

The present disclosure pertains to the field of information processing, and more particularly, to the field of virtualizing resources in information processing systems.

2. Description of Related Art

Generally, the concept of virtualization of resources in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A processor in an information processing system may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that the VMM may operate, for example, to implement virtualization policies (a "VM exit"). The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

DETAILED DESCRIPTION

Embodiments of processors, methods, and systems for virtualizing interrupt prioritization and delivery are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved by reducing the frequency of VM exits. Embodiments of the invention may be used to reduce the frequency of VM exits associated with the prioritization and delivery of interrupts. An embodiment may be used to support the virtualization of a local Advanced Programmable Interrupt Controller ("APIC") in a processor in the Core® Processor Family from Intel Corporation, and any other processor from any company, such as the Atom® Processor Family from Intel Corporation. In this embodiment, performance may be improved over a virtualization environment in which guest accesses to the local APIC are intercepted by a VMM, by eliminating the need for a VM exit on some guest accesses to the local APIC.

Figure 1:
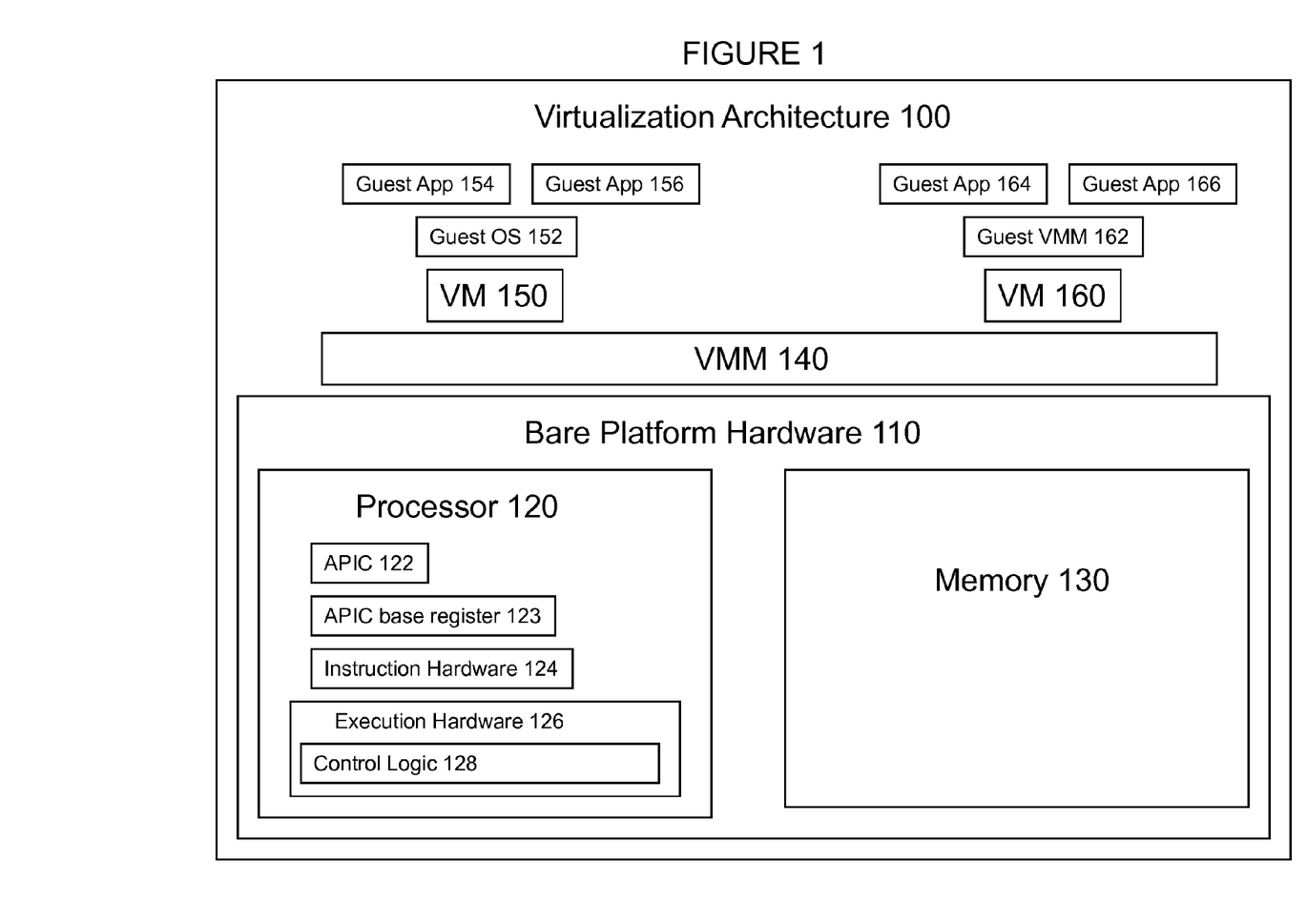
FIG. 1 illustrates a virtualization architecture in which an embodiment of the present invention may provide for virtualizing interrupt prioritization and delivery.

FIG. 1 illustrates virtualization architecture 100, in which an embodiment of the present invention may operate. In FIG. 1, bare platform hardware 110 may be any data processing apparatus capable of executing any OS, VMM, or other software. For example, bare platform hardware 110 may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Core® Processor Family, the Atom® Processor Family, or other processor family from Intel Corporation, or another processor from another company, or a digital signal processor or microcontroller. Although FIG. 1 shows only one such processor 120, bare platform hardware 110 may include any number of processors, including any number of multicore processors, each with any number of execution cores and any number of multithreaded processors, each with any number of threads.

Memory 130 may be static or dynamic random access memory, semiconductor-based read only or flash memory, magnetic or optical disk memory, any other type of medium readable by processor 120, or any combination of such mediums. Processor 120, memory 130, and any other components or devices of bare platform hardware 110 may be coupled to or communicate with each other according to any known approach, such as directly or indirectly through one or more buses, point-to-point, or other wired or wireless connections. Bare platform hardware 110 may also include any number of additional devices or connections.

Figure 2:
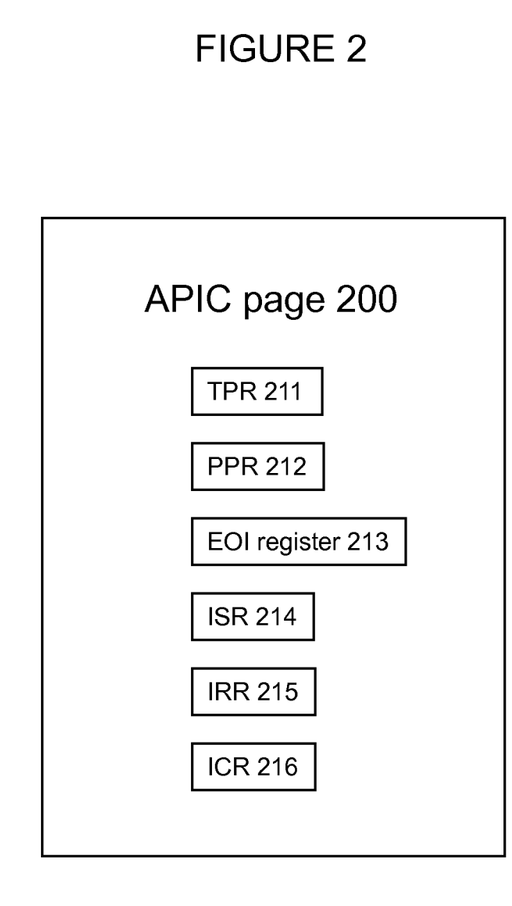
FIG. 2 illustrates a local APIC page in a processor in an embodiment of the present invention.

Processor 120 may include interrupt controller 122 to receive, generate, prioritize, deliver, hold pending, or otherwise control or manage interrupt requests. For example, interrupt controller 122 may be a local APIC. Processor 120 may also include local APIC base address register or storage location 123 to store a base address of a page or other ranges of addresses through which the registers or other control or status locations of an interrupt controller 122 may be accessed. In this embodiment, local APIC base address register 123 is a 24-bit field of a 64-bit register used to store the base address of 4-kilobyte local APIC page 200, as shown in FIG. 2. Local APIC page 200 includes task priority register (TPR) field 211 at offset 80h, processor priority register (PPR) field 212 at offset A0h, end-of-interrupt (EOI) register field 213 at offset B0h, in-service register (ISR) field 214 at offset 100h, interrupt request register (IRR) field 215 at offset 200h, and interrupt command register (ICR) field 216 at offset 300h.

Additionally, processor 120 includes instruction hardware 124 and execution hardware 126. Instruction hardware 124 may include any circuitry or other hardware, such as a decoder, to receive instructions for execution by processor 120. Execution hardware 126 may include any circuitry or other hardware, such as an arithmetic logic unit, to execute instructions for processor 120. Execution hardware may include or be controlled by control logic 128. Control logic 128 may be microcode, programmable logic, hard-coded logic, or any other form of control logic within processor 120. In other embodiments, control logic 128 may be implemented in any form of hardware, software, or firmware, such as a processor abstraction layer, within a processor or within any component accessible or medium readable by a processor, such as memory 130. Control logic 128 may cause execution logic 126 to execute method embodiments of the present invention, such as the method embodiments illustrated below in FIGS. 4 through 9, for example, by causing processor 120 to include the execution of one or more micro-operations to support virtualization, in its response to virtualization instructions, other instructions from a host or guest, or events occurring on bare platform hardware 110.

In addition to bare platform hardware 110, FIG. 1 illustrates VMM 140, VMs 150 and 160, and guest OSs and applications 152, 154, 156, 162, 164, and 166.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies. In other embodiments, a host may be any VMM, hypervisor, OS, or other software, firmware, or hardware capable of controlling bare platform hardware 110. A guest may be any OS, any VMM, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 156 installed on VM 150 and guest OS 162 and guest applications 164 and 166 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, a VM exit may occur, transferring control from the guest to VMM 140. After handling the event or facilitating the access to the resource appropriately, VMM 140 may return control to a guest. The transfer of control from VMM 140 to a guest (including an initial transfer to a newly created VM) is referred to as a "VM entry" herein.

Figure 3:
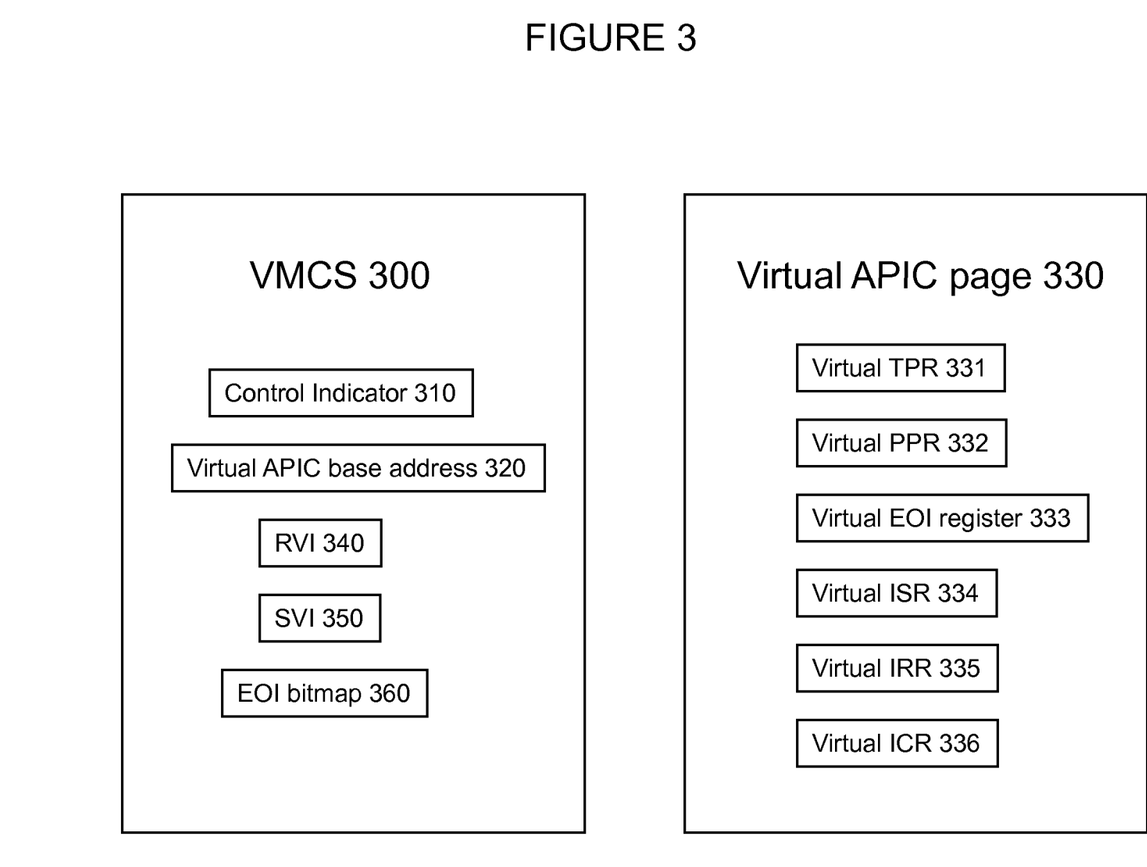
FIG. 3 illustrates a virtual machine control structure and a virtual APIC page in an embodiment of the present invention.

In the embodiment of FIG. 1, processor 120 controls the operation of VMs 150 and 160 according to data stored in virtual machine control structure ("VMCS") 300, as shown in FIG. 3. VMCS 300 is a data structure that may contain state of a guest or guests, state of VMM 140, execution control information indicating how VMM 140 is to control operation of a guest or guests, information regarding VM exits and VM entries, any other such information. Processor 120 reads information from VMCS 300 to determine the execution environment of a VM and constrain its behavior. In this embodiment, VMCS 300 is stored in memory 130. In some embodiments, multiple VMCSs are used to support multiple VMs.

VMCS 300 may include fields, control bits, or other data structures to support the virtualization of an interrupt controller such as local APIC 122. Execution hardware 126 and/or control logic 128 may refer to these fields in VMCS 300 to determine how to manage a VM environment including support for interrupt prioritization and delivery. For example, virtual interrupt delivery control indicator 310 may be set to enable the virtualization of interrupt prioritization and delivery in non-root mode, as described below. In the description of this embodiment, an indicator such as virtual interrupt delivery control 310 may be a bit that is set to a high or logical '1' value to enable or cause a desired effect (or cleared to a low or logical '0' value to cause the opposite), but any logic convention or nomenclature may be used within the scope of the present invention.

Also in VMCS 300, virtual APIC base address field 320 may be used to store a base address of a page or other region of memory 130 at which virtual copies of one or more of the register or other control or status locations of an interrupt controller may be stored. In this embodiment, virtual APIC base address field 320 is used to store the base address of virtual APIC page 330. Virtual APIC page 330 includes virtual TPR field 331, virtual PPR field 332, virtual EOI field 333, virtual ISR field 334, virtual IRR field 335, and virtual ICR field 336. For example, virtual APIC base address field 320 may be a 24-bit field specifying the location in memory of 4-kilobyte virtual APIC page 330, such that a virtual copy of a task priority class may be stored in bits 7:4 of virtual TPR field 331 and a virtual copy of a task priority subclass may be stored in bits 3:0 of virtual TPR field 331, at offset 80h of virtual APIC page 330, and a virtual copy of a processor priority class may be read from bits 7:4 of virtual PPR field 332 and a virtual copy of a processor priority subclass may be read from bits 3:0 of virtual PPR field 332, at offset A0h of virtual APIC page 330. Also, a virtual EOI register may be provided using virtual EOI field 333 at offset B0h of virtual APIC page 330, a virtual ISR may be provided using virtual ISR field 334 at offset 100h of virtual APIC page 330, and a virtual IRR may be provided using virtual IRR field 335 at offset 200h of virtual APIC page 330.

VMCS 300 may also include RVI field 340 for the highest priority virtual interrupt requesting service, SVI field 350 for the highest priority virtual interrupt in service, and EOI bitmap field 360 for a 256-entry EOI bitmap. The use of these three fields is explained below.

FIGS. 4 through 9 illustrate embodiments of the present invention in methods for virtualizing interrupt prioritization and delivery. Although method embodiments are not limited in this respect, reference is made to virtualization architecture 100 of FIG. 1, local APIC page 200 of FIG. 2, and VMCS 300 of FIG. 3 to describe the method embodiments of FIGS. 4 through 9. Each Figure may include some actions performed by software (e.g., a VMM) and other actions performed by hardware. However, software and/or hardware may perform additional actions (not shown) in connection with the actions shown.

Figure 4:
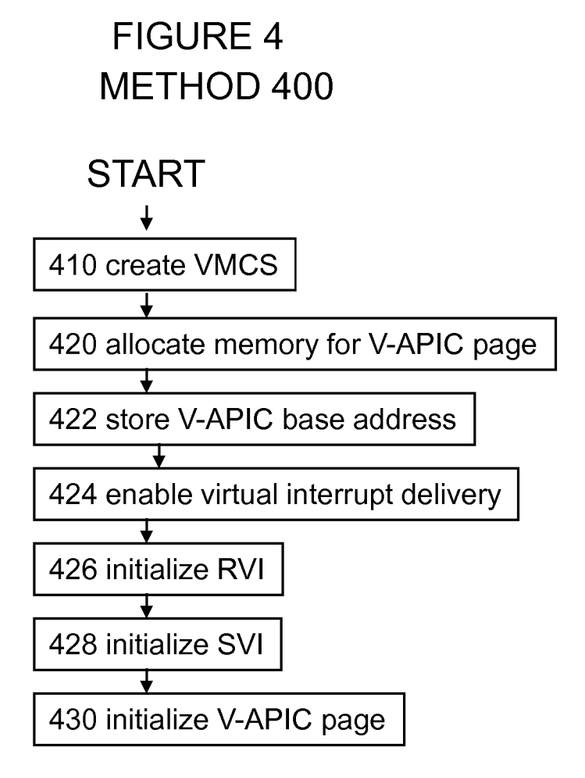
FIGS. 4 to 9 illustrate method embodiments of the present invention.

FIG. 4 illustrates method 400, a method embodiment of the present invention that may be performed in connection with other method embodiments of the present invention, such as methods 500, 600, 700, 800, and 900. Method 400 may be performed as part of the initialization of embodiments of the invention on a particular virtual processor.

In box 410 of FIG. 4, a VMM (e.g., VMM 140) creates a VMCS (e.g., VMCS 300) for a VM (e.g., VM 150). In boxes 420 through 430, VMM 140 configures VMCS 300 to implement virtualization of interrupt prioritization and delivery. In box 420, memory (e.g., a page in memory 130) is allocated for a virtual APIC page (e.g., virtual APIC page 330). In box 422, a base address for virtual APIC page 330 is stored in virtual APIC base address field 320. In box 424, virtual interrupt delivery control indicator 310 is set to enable the virtualization of interrupt prioritization and delivery in non-root mode. In box 426, VMM 140 may store initialization data (e.g., all zeroes) in RVI field 340. In box 428, VMM 140 may store initialization data (e.g., all zeroes) in SVI field 350. In box 430, VMM 140 may store initialization data in virtual APIC page 330.

Figure 5:
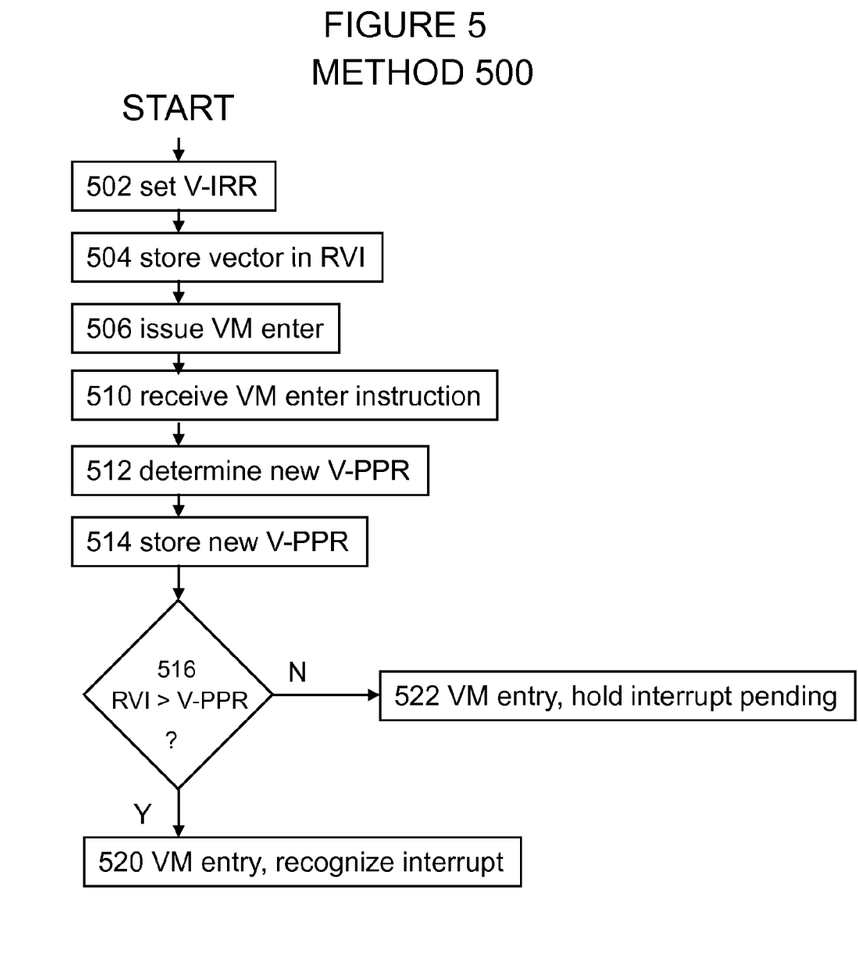

FIG. 5 illustrates method 500, a method embodiment of the present invention that may be performed in connection with other method embodiments of the present invention, such as methods 400, 600, 700, 800, and 900. Method 500 may be performed in connection with a VM entry, when virtualization of interrupt prioritization and delivery in non-root mode is enabled, for example, by the setting of virtual interrupt delivery control indicator 210.

In box 502, VMM 140 may set the bit in virtual IRR 335 corresponding to the interrupt vector of the interrupt requesting service. Note that box 502 may be repeated for any other interrupts requesting service. In box 504, VMM 140 may store an interrupt vector of an interrupt requesting service in RVI field 340; for example, RVI field 340 may be set (or may be left as is) with the maximum of the old RVI value and the highest interrupt vector from any repetition of box 502. In box 506, an instruction to transfer control to VM 150 (a "VM enter" instruction) is issued by VMM 140.

In box 510 of method 500, instruction hardware 124 of processor 120 receives a VM enter instruction. In boxes 512 to 516, execution hardware 126 of processor 120 executes portions of the VM enter instruction relating to embodiments of the present invention. Execution of the VM instruction may include saving of host state, loading of guest state, and any other operations known in the art, in addition to those shown here. In box 512, execution hardware 126 determines a new virtual processor priority value by computing the maximum of the value in SVI field 350 and the value in virtual TPR field 331. In box 514, execution hardware 126 stores the new virtual processor priority value in virtual PPR field 332. In box 516, execution hardware 126 compares the value in RVI field 340 to the value in virtual PPR field 332, and if the RVI field 340 value is greater than the virtual PPR field 332 value, method 500 continues in box 520, but if not, method 500 continues in box 522. In box 520, a VM entry occurs and the pending virtual interrupt corresponding to the RVI field 340 value is recognized. In box 522, a VM entry completes but any virtual interrupt corresponding to the RVI field 340 value is held pending.

Figure 6:
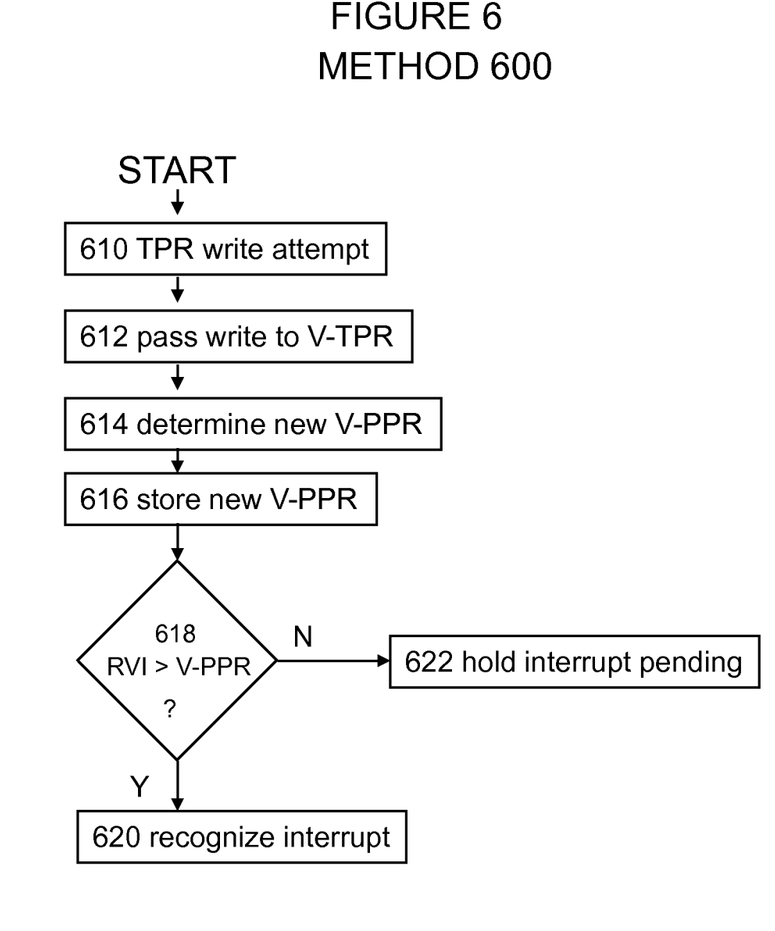

FIG. 6 illustrates method 600, a method embodiment of the present invention that may be performed in connection with other method embodiments of the present invention, such as methods 400, 500, 700, 800, and 900. Method 600 may be performed when virtualization of interrupt prioritization and delivery in non-root mode is enabled, for example, by the setting of virtual interrupt delivery control indicator 210. Method 600 may be performed entirely in non-root mode without a VM exit, in connection with a write by guest software to an APIC register (e.g., TPR).

In box 610 of method 600, guest software attempts to write a new task priority value to TPR field 211 of local APIC page 200. In response to guest software attempting to write to TPR field 211, execution hardware 126 performs boxes 612 to 622 instead of a write to TPR field 211 or a VM exit occurring. In box 612, execution hardware 126 passes the write to virtual TPR field 331 on virtual APIC page 330. In box 614, execution hardware 126 determines a new virtual processor priority value by computing the maximum of the virtual task priority value from virtual TPR field 331 and the value in SVI field 350. In box 616, execution hardware 126 stores the new virtual processor priority value in virtual PPR field 332. In box 618, execution hardware 126 compares the value in RVI field 340 to the virtual PPR field 332 value, and if the RVI field 340 value is greater than the virtual PPR field 332, method 600 continues in box 620, but if not, method 600 continues in box 622. In box 620, execution hardware 126 recognizes the pending virtual interrupt corresponding to the RVI field 340 value. In box 622, execution hardware 126 holds pending any virtual interrupt corresponding to the RVI field 340 value.

Figure 7:
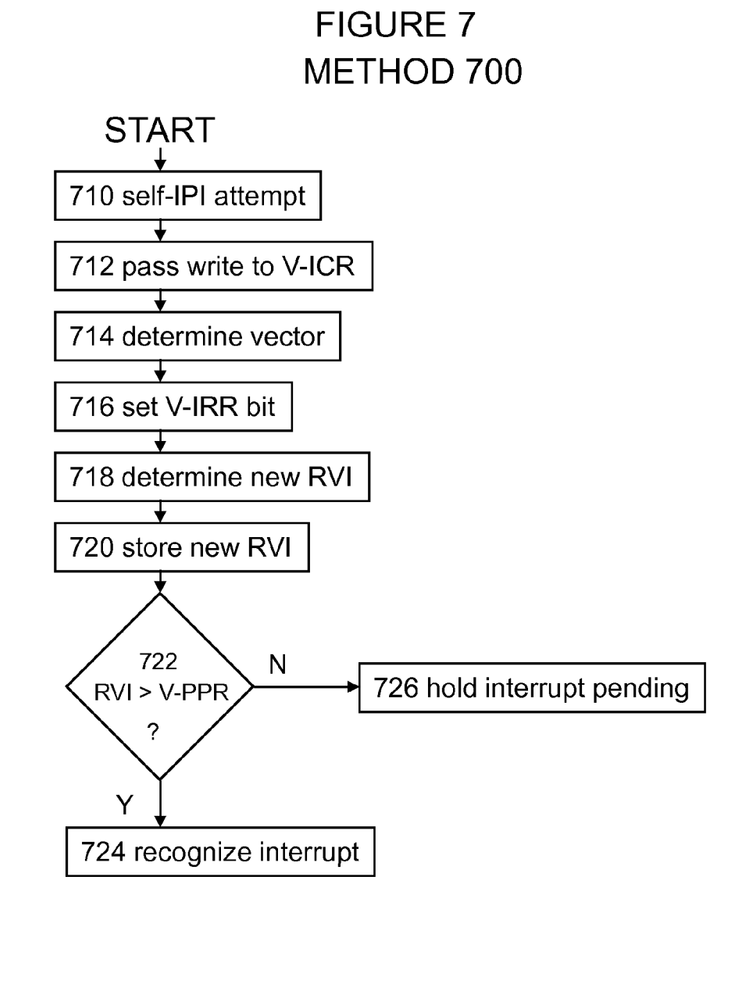

FIG. 7 illustrates method 700, a method embodiment of the present invention that may be performed in connection with other method embodiments of the present invention, such as methods 400, 500, 600, 800, and 900. Method 700 may be performed when virtualization of interrupt prioritization and delivery in non-root mode is enabled, for example, by the setting of virtual interrupt delivery control indicator 210. Method 700 may be performed entirely in non-root mode without a VM exit, in connection with an attempt by guest software to send a self-IPI, for example, by writing to an APIC register (e.g., ICR 216 or a special self-IPI register).

In box 710 of method 700, guest software running on processor 120 attempts to direct processor 120 to send an inter-processor-interrupt to itself (i.e., send a "self-IPI"); for example, by writing to ICR 216 of local APIC page 200. In response to guest software attempting to send a self-IPI, execution hardware 126 performs boxes 712 to 726 instead of a write to ICR 216 or a VM exit occurring. In box 712, execution hardware 126 passes the write to virtual ICR 336 on virtual APIC page 330. In box 714, execution hardware 126 determines the vector of the interrupt to be sent, e.g., by reading the vector field of virtual ICR 336. In box 716, execution hardware 126 sets the bit corresponding to that vector in virtual IRR field 335, to indicate an interrupt corresponding to that vector is pending. In box 718, execution hardware 126 determines a new RVI value by computing the maximum of this vector and the value in RVI field 340. In box 720, execution hardware 126 stores the new RVI value in RVI field 340. In box 722, execution hardware 126 compares the new RVI value to the value in virtual PPR field 332, and if the new RVI value is greater than the virtual PPR field 332 value, method 700 continues in box 724, but if not, method 700 continues in box 726. In box 724, execution hardware 126 recognizes the pending virtual interrupt corresponding to the new RVI value.

In box 726, execution hardware 126 holds pending any virtual interrupt corresponding to the new RVI value.

Figure 8:
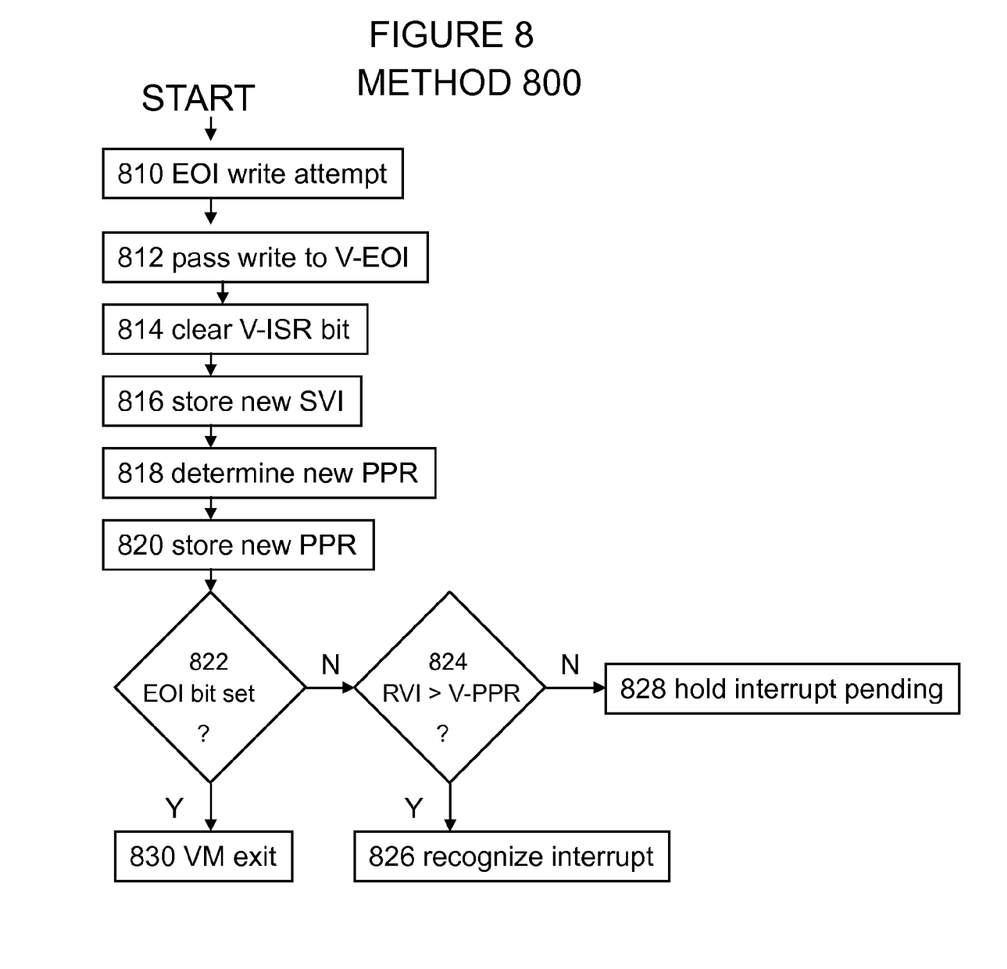

FIG. 8 illustrates method 800, a method embodiment of the present invention that may be performed in connection with other method embodiments of the present invention, such as methods 400, 500, 600, 700, and 900. Method 800 may be performed when virtualization of interrupt prioritization and delivery in non-root mode is enabled, for example, by the setting of virtual interrupt delivery control indicator 210. Method 800 may be performed in connection with an attempt by guest software to write to EOI register field 213 of local APIC page 200.

In box 810 of method 800, guest software running on processor 120 attempts to write to EOI register field 213 of local APIC page 200. In response to guest software attempting to write to EOI register field 213, execution hardware 126 performs boxes 812 to 822 instead of an EOI write to EOI register field 213 occurring. In box 812, execution hardware 126 passes the write to virtual EOI register field 333 on virtual APIC page 330. In box 814, execution hardware 126 clears the bit corresponding to the current SVI 350 field value in virtual ISR field 334. In box 816, execution hardware 126 stores, in SVI field 350, the index of the highest priority bit still set in virtual ISR field 334 (or zero if no bit is set). In box 818, execution hardware 126 determines a new processor priority value by computing the maximum of the new SVI value and the virtual TPR field 331 value. In box 820, execution hardware 126 stores the new processor priority value in virtual PPR field 332. In box 822, execution hardware 126 determines whether the bit in EOI bitmap field 360 corresponding to the old SVI value is set, and, if so, method 800 continues in box 830, but if not, method 800 continues in box 824. In box 830, a VM exit occurs. In box 824, execution hardware 126 compares the value in RVI field 340 to the value in virtual PPR field 332, and if the RVI field 340 value is greater than the virtual PPR field 332 value, method 800 continues in box 826, but if not, method 800 continues in box 828. In box 826, execution hardware 126 recognizes the pending virtual interrupt corresponding to the RVI field 340 value. In box 828, execution hardware 126 holds pending any virtual interrupt corresponding to the RVI field 340 value.

Figure 9:
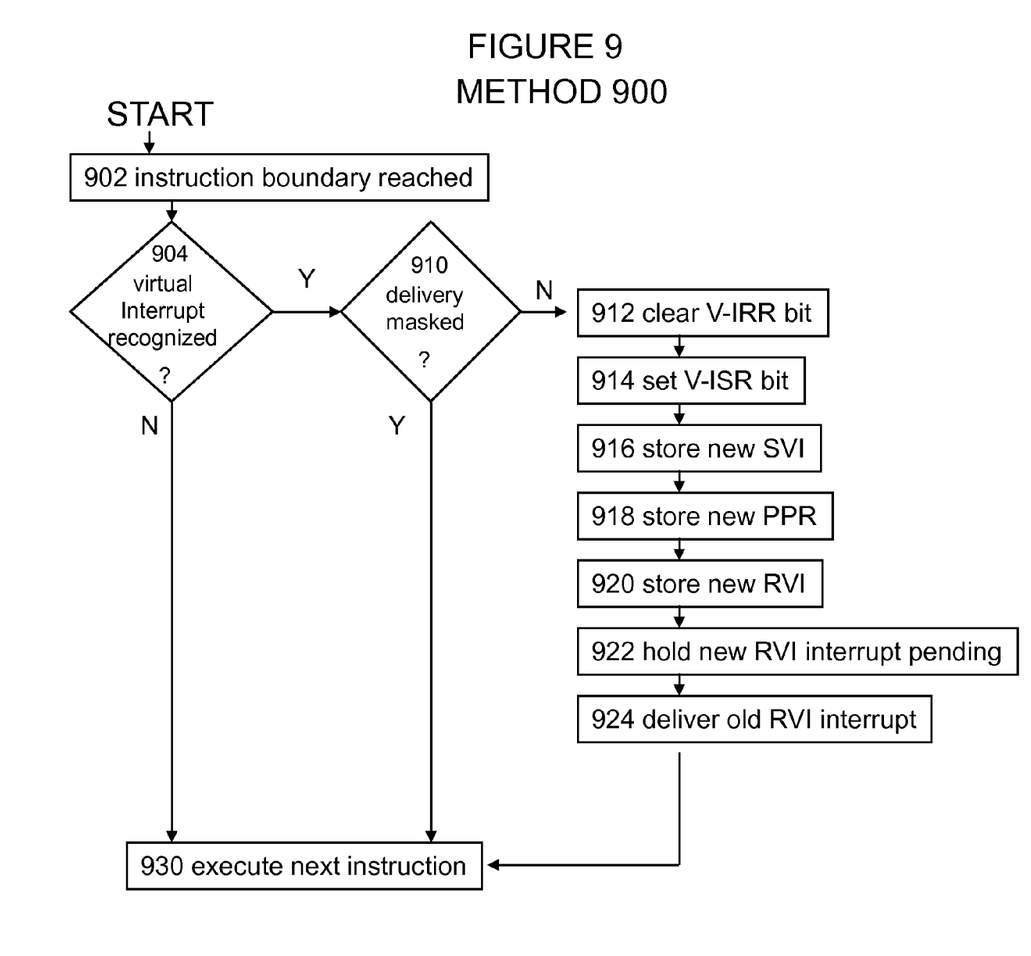

FIG. 9 illustrates method 900, a method embodiment of the present invention that may be performed in connection with other method embodiments of the present invention, such as methods 400, 500, 600, 700, and 800. Method 900 may be performed when virtualization of interrupt prioritization and delivery in non-root mode is enabled, for example, by the setting of virtual interrupt delivery control indicator 210. Method 900 may be performed entirely in non-root mode without a VM exit, in connection with the delivery of a virtual interrupt.

In box 902 of method 900, an instruction boundary is reached, for example during the execution of guest software on a virtual machine. In box 904, execution hardware 126 determines whether a virtual interrupt has been recognized, for example from box 520, 620, 724, or 826 of methods 500, 600, 700, or 800, respectively. If a virtual interrupt has not been recognized, then method 900 continues to box 930; if not, method 900 continues to box 910.

In box 910, execution hardware 126 determines whether delivery of virtual interrupts is masked at the instruction boundary (for example, because the interrupt flag in the EFLAGS register of processor 120 is cleared). If delivery of virtual interrupts is masked, then method 900 continues to box 930; if not, method 900 continues in box 912. In box 912, execution hardware 126 clears the bit corresponding to the RVI field 340 value in virtual IRR field 335. In box 914, execution hardware 126 sets the bit corresponding to the RVI field 340 value in virtual ISR field 334. In box 916, execution hardware 126 stores the RVI field 340 value in SVI field 350. In box 918, execution hardware 126 stores the RVI field 340 value in virtual PPR field 332. In box 920, execution hardware 126 stores, in RVI field 340, the index of the highest priority bit still set in virtual IRR field 335 (or zero if no bit is set). In box 922, execution hardware 126 holds pending any interrupt corresponding to the new RVI value. In box 924, execution hardware 132 delivers, to the guest software running on processor 120, the interrupt with the vector corresponding to the old RVI value (for example, by using it to select a gate in the interrupt descriptor table).

In box 930, the next instruction is executed.

Within the scope of the present invention, the methods illustrated in FIGS. 4 through 9 may be performed in a different order, with illustrated boxes omitted, with additional boxes added, or with a combination of reordered, omitted, or additional boxes.

Thus, processors, methods, and systems for virtualizing interrupt prioritization and delivery have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor for virtualizing interrupt prioritization and delivery comprising:
an instruction hardware to receive a plurality of instructions, including a first instruction to transfer the processor from a root mode to a non-root mode for executing guest software in a virtual machine, wherein the processor is to return to the root mode upon the detection of any of a plurality of virtual machine exit events;
an execution hardware to execute the first instruction, the execution of the first instruction to include determining a first virtual processor-priority value by computing the maximum of a highest priority virtual interrupt in-service field of a virtual machine control structure and a virtual task-priority register value, and storing the first virtual processor-priority value in a virtual copy of a processor-priority field, where the virtual copy of the processor-priority field is a virtual resource corresponding to a physical resource associated with an interrupt controller;
the execution hardware to determine:
in non-root mode, whether a virtual interrupt is to be delivered by comparing a highest priority virtual interrupt-requested field of the virtual machine control structure and the first processor-priority value, and to deliver the virtual interrupt in response to determining that the highest priority virtual interrupt-requested field is greater than the first virtual processor-priority value, or to hold the virtual interrupt pending in response to determining that the highest priority virtual interrupt-requested field is not greater than the first virtual processor-priority value; and in non-root mode, whether the virtual interrupt is to be delivered at a boundary between a second instruction and a third instruction by determining whether delivery of virtual interrupts is masked at the boundary, and to deliver the virtual interrupt in response to determining that delivery of virtual interrupts is unmasked, or to execute the third instruction in non-root mode in response to determining that delivery of virtual interrupts is masked.

2. The processor of claim 1, wherein the execution hardware is also to respond, within the non-root mode, to an attempt by the guest software to write a task-priority value to a task-priority register by computing the maximum of the task-priority value and a highest priority virtual interrupt in-service field of a virtual machine control structure to determine a second virtual processor-priority value.

3. The processor of claim 2, wherein the execution hardware is also to determine whether the virtual interrupt is to be recognized by comparing a highest priority virtual interrupt-requested field of a virtual machine control structure and the second virtual processor-priority value.

4. The processor of claim 1, wherein the execution hardware is also to respond, within the non-root mode, to an attempt by the guest software to send a self-interprocessor interrupt by computing the maximum of a self-interprocessor interrupt vector and a highest priority virtual interrupt-requested field of a virtual machine control structure to determine a new highest priority virtual interrupt-requested value.

5. The processor of claim 4, wherein the execution hardware is also to determine whether the virtual interrupt is to be recognized by comparing the new highest priority virtual interrupt-requested value and the first virtual processor-priority value.

6. The processor of claim 1, wherein the execution hardware is also to respond, within the non-root mode, to an attempt by the guest software to write to an end-of-interrupt register by clearing a bit in a virtual copy of an in-service register, the bit corresponding to a highest priority virtual interrupt in-service field in a virtual machine structure.

7. A method for virtualizing interrupt prioritization and delivery comprising:
receiving, by a processor, a first instruction to transfer the processor from a root mode to a non-root mode for executing guest software in a virtual machine, wherein the processor is to return to the root mode upon the detection of any of a plurality of virtual machine exit events;
executing, by the processor, the first instruction, where execution includes determining a first virtual processor-priority value by computing the maximum of a highest priority virtual interrupt in-service field of a virtual machine control structure and a virtual task-priority register value, and storing the first virtual processor-priority value in a virtual copy of a processor-priority field, where the virtual copy of the processor-priority field is a virtual resource corresponding to a physical resource associated with an interrupt controller;
determining, in non-root mode, whether a virtual interrupt is to be delivered by comparing a highest priority virtual interrupt-requested field of the virtual machine control structure and the first virtual processor priority value, and to deliver the virtual interrupt in response to determining that the highest priority virtual interrupt-requested field is greater than the first virtual processor-priority value, or to hold the virtual interrupt pending in response to determining that the highest priority virtual interrupt-requested field is not greater that the first virtual processor-priority;
determining, in non-root mode, whether delivery of virtual interrupts is masked at a boundary between a second instruction to be executed and a third instruction; and
delivering the virtual interrupt in response to determining that delivery of virtual interrupts is unmasked or executing the third instruction in non-root mode in response to determining that delivery of virtual interrupts is masked.

8. The method of claim 7, further comprising responding, within the non-root mode, to an attempt by the guest software to write a task priority value to a task-priority register by computing the maximum of the task-priority value and a highest priority virtual interrupt in-service field of a virtual machine control structure to determine a second virtual processor-priority value.

9. The method of claim 8, further comprising determining whether the virtual interrupt is to be recognized by comparing a highest priority virtual interrupt-requested field of a virtual machine control structure and the second virtual processor-priority value.

10. The method of claim 7, further comprising responding, within the non-root mode, to an attempt by the guest software to send a self-interprocessor interrupt by computing the maximum of a self-interprocessor interrupt vector and a highest priority virtual interrupt-requested field of a virtual machine control structure to determine a new highest priority virtual interrupt-requested value.

11. The method of claim 10, further comprising determining whether the virtual interrupt is to be recognized by comparing the new highest priority virtual interrupt-requested value and the first virtual processor-priority value.

12. The method of claim 7, further comprising responding, within a non-root mode, to an attempt by the guest software to write to an end-of-interrupt register by clearing a bit in a virtual copy of an in-service register, the bit corresponding to a highest priority virtual interrupt in-service field in a virtual machine structure.

13. A system for virtualizing interrupt prioritization and delivery comprising:
a memory; and
a processor including
an instruction hardware to receive a plurality of instructions, including a first instruction to transfer the processor from a root mode to a non-root mode for executing guest software in a virtual machine, wherein the processor is to return to the root mode upon the detection of any of a plurality of virtual machine exit events;
an execution hardware to execute the first instruction, the execution of the first instruction to include determining a virtual processor-priority value by computing the maximum of a highest priority virtual interrupt in-service field of a virtual machine control structure in the memory and a virtual task-priority register value, and storing the first virtual processor-priority value in the memory in a virtual copy of a processor-priority field, where the virtual copy of the processor-priority field is a virtual resource corresponding to a physical resource associated with an interrupt controller;
the execution hardware to determine:
in non-root mode, whether a virtual interrupt is to be delivered by comparing a highest priority virtual interrupt-requested field of the virtual machine control structure and the first processor-priority value, and to deliver the virtual interrupt in response to determining that the highest priority virtual interrupt-requested field is greater than the first virtual processor-priority value, or to hold the virtual interrupt pending in response to determining that the highest priority virtual interrupt-requested field is not greater than the first virtual processor-priority value; and in non-root mode, whether the virtual interrupt is to be delivered at a boundary between a second instruction and a third instruction by determining whether delivery of virtual interrupts is masked at the boundary, and to deliver the virtual interrupt in response to determining that delivery of virtual interrupts is unmasked, or to execute the third instruction in non-root mode in response to determining that delivery of virtual interrupts is masked.

* * * * *